United States Patent
Horng et al.

(10) Patent No.: US 6,762,519 B1
(45) Date of Patent: Jul. 13, 2004

(54) OUTER ROTOR STRUCTURE FOR AN AC FAN

(75) Inventors: Alex Horng, Kaohsiung (TW); Wen-Shing Wu, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/340,786

(22) Filed: Jan. 13, 2003

(51) Int. Cl.[7] ............................................. H02K 11/00

(52) U.S. Cl. ................................. 310/67 R; 310/216

(58) Field of Search ............................. 310/67 R, 216, 310/261, 217, 218

(56) References Cited

U.S. PATENT DOCUMENTS 4,130,770 A * 12/1978 Wrobel ..................... 310/67 R
4,395,815 A * 8/1983 Stanley et al. ................ 29/598

* cited by examiner

Primary Examiner—Thanh Lam
(74) Attorney, Agent, or Firm—Bacon & Thomas, PLLC

(57) ABSTRACT

An outer rotor structure for an ac fan includes a plurality of annular pole plates used to stack on each other to form an outer rotor. Each of the pole plates includes an axial hole, a plurality of poles, at least one aligning member and a plurality of recessions. The aligning member is used to align two adjacent pole plates for stacking so that the recession of the pole plate are turned at a slight angle in stacked relationship with those of the adjacent pole plate. The longitudinally connected recessions form a plurality of assembling grooves adapted to mount ends of metal blades therein at predetermined positions by welding.

5 Claims, 4 Drawing Sheets

OUTER ROTOR STRUCTURE FOR AN AC FAN

BACKGROUND OF THE INVENTION

1. Field of the Invention

The present invention is related to an outer rotor structure for an ac fan and more particularly to an outer rotor structure adapted to be combined with metal blades for convenient assembly.

2. Description of the Related Art

Referring to FIG. 1, a conventional ac fan includes an outer rotor 9. The outer rotor 9 generally consists of a plurality of annular pole plates 90, which are stacked on each other. The stacked pole plates 90 are combined with a rotor hub 91. A plurality of blades 92 are equi-spaced and welded on an outer circumference of the outer rotor 9.

In order to rotate the outer rotor 9 in a balanced manner, the conventional blades 92 must be equi-spaced precisely around an outer periphery of the outer rotor 9. Thereby, it can be seen that a need remains for recision instruments, such as a clamp, for finding out precise welding points of the blades 92 positioned on the outer circumference of the outer rotor 9. In attempting to determine these welding points, assembly/manufacturing operations are sophisticated and time-wasting. Moreover, in an initial welding operation, no fixing support exists between any two welding points of the blades 92 and therefore a unilateral force biases the first welding of one of the blades 92. The blade 92 is relatively shifted on the outer rotor 9. Consequently, the combined blade and outer rotor member is unsymmetrical in structure and unbalanced in rotation so that the unsymmetrical blades cause vibration and noise.

The present invention intends to provide an outer rotor structure for an ac fan adapted to combine with metal blades in such a way to mitigate and overcome the above problem.

SUMMARY OF THE INVENTION

The primary objective of this invention is to provide an outer rotor structure for an ac fan adapted to combine with metal blades for convenient assembling and manufacture.

The secondary objective of this invention is to provide the outer rotor structure for the ac fan having assembling grooves to mount metal blades at predetermined positions and angles, thereby rotating the rotor in a stable and balanced manner.

The outer rotor structure for the ac fan in accordance with the present invention mainly comprises a plurality of annular pole plates used to stack on each other to form an outer rotor. Each of the pole plates includes an axial hole, a plurality of poles, at least one aligning member and a plurality of recessions. The aligning member is used to align the two adjacent pole plates for stacking so that the recessions of the pole plate are turned at a slight angle in stacked relationship with those of the adjacent pole plate. The longitudinally connected recessions are formed as a plurality of assembling grooves adapted to mount ends of metal blades therein at predetermined positions by welding.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 2:
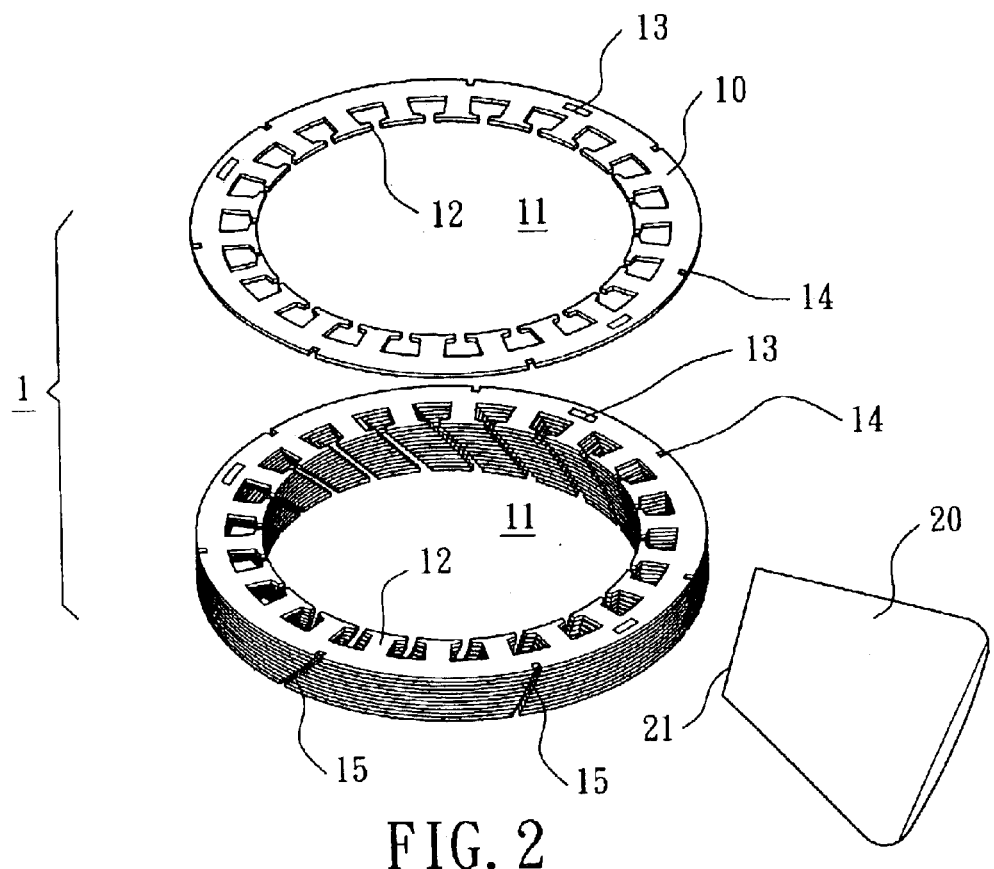
FIG. 2 is an exploded perspective view of an outer rotor structure for an ac fan in accordance with an embodiment of the present invention.
Figure 3:
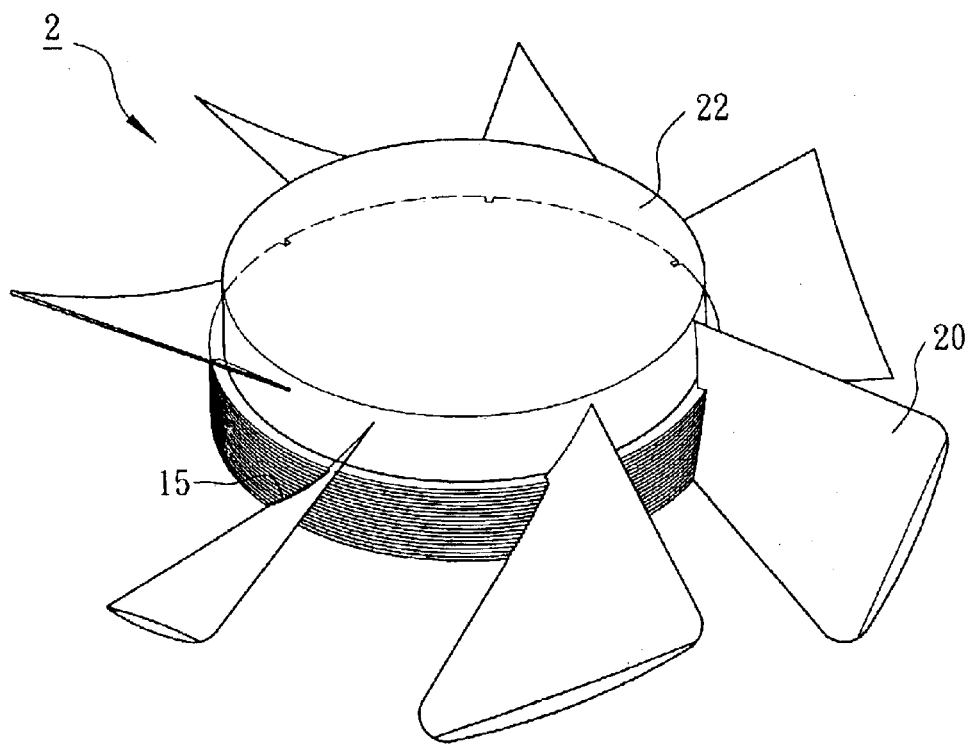
FIG. 3 is a perspective view of the outer rotor structure for the ac fan in accordance with the embodiment of the present invention.

Referring to FIGS. 2 and 3, an outer rotor of an embodiment includes a plurality of annular pole plates 10 stacked to form an outer rotor 1 and a rotor hub 22 attached thereto. A plurality of metal blades 20 is connected to an outer circumference of the outer rotor 1 to form a fan wheel 2.

Constructions of the annular pole plate 10 shall be described in detail. Referring again to FIGS. 2 and 3, the pole plate 10 is made of conventional silicon steel plate or any other suitable material and has a substantially annular form. Each pole plate 10 is provided with an axial hole 11 and a plurality of poles 12 arranged therein so that the stacked pole plates 10 are able to form as an outer rotor 1 in which an inner stator (not shown) is contained. The poles 12 of the outer rotor 1 are driven to rotate by induction of the stator. Each pole plate 10 includes at least one aligning member 13 formed as a complementary depression and protrusion on both side surfaces by press operation. The aligning member 13 is used to align the two adjacent pole plates 10 for stacking at a predetermined position. Accordingly, correct alignment of an assembling operation is assured. Each pole plate 10 further includes a plurality of recessions 14, such as seven grooves, equi-spaced around an outer circumference. When any two pole plates 10 are stacked along a vertical line defined by the aligning grooves 13, the recessions 14 of the pole plate 10 are turned a slight angle in stacked relationship with those of the adjacent pole plate 10. After the pole plates 10 are stacked to form the outer rotor 1, the longitudinally connected recessions 14 a series of equi-spaced assembling grooves 15, which extend helically in an inclined direction with respect to the outer circumference. The assembling grooves 15 are adapted to mount ends of metal blades 22 therein at predetermined positions by welding.

Construction of the metal blade 20 shall be described in detail. Referring again to FIGS. 2 through 4, the metal blades 20 have identical configuration, dimensions, and weight. Each blade 20 includes an end 21 used to insert into the associated assembling groove 15 and securely connected thereto by welding.

Referring again to FIG. 3, the pole plates 10 are axially stacked along the aligning members 13 to form the outer rotor 1 and the rotor hub 22 is compactly attached thereto as a unit. In welding operation the end 21 of the blades 20 is inserted into the helical assembling grooves 15 while the other end radially extends outward. Consequently, the entire structure of the fan wheel 2 is made more unified.

Figure 4:
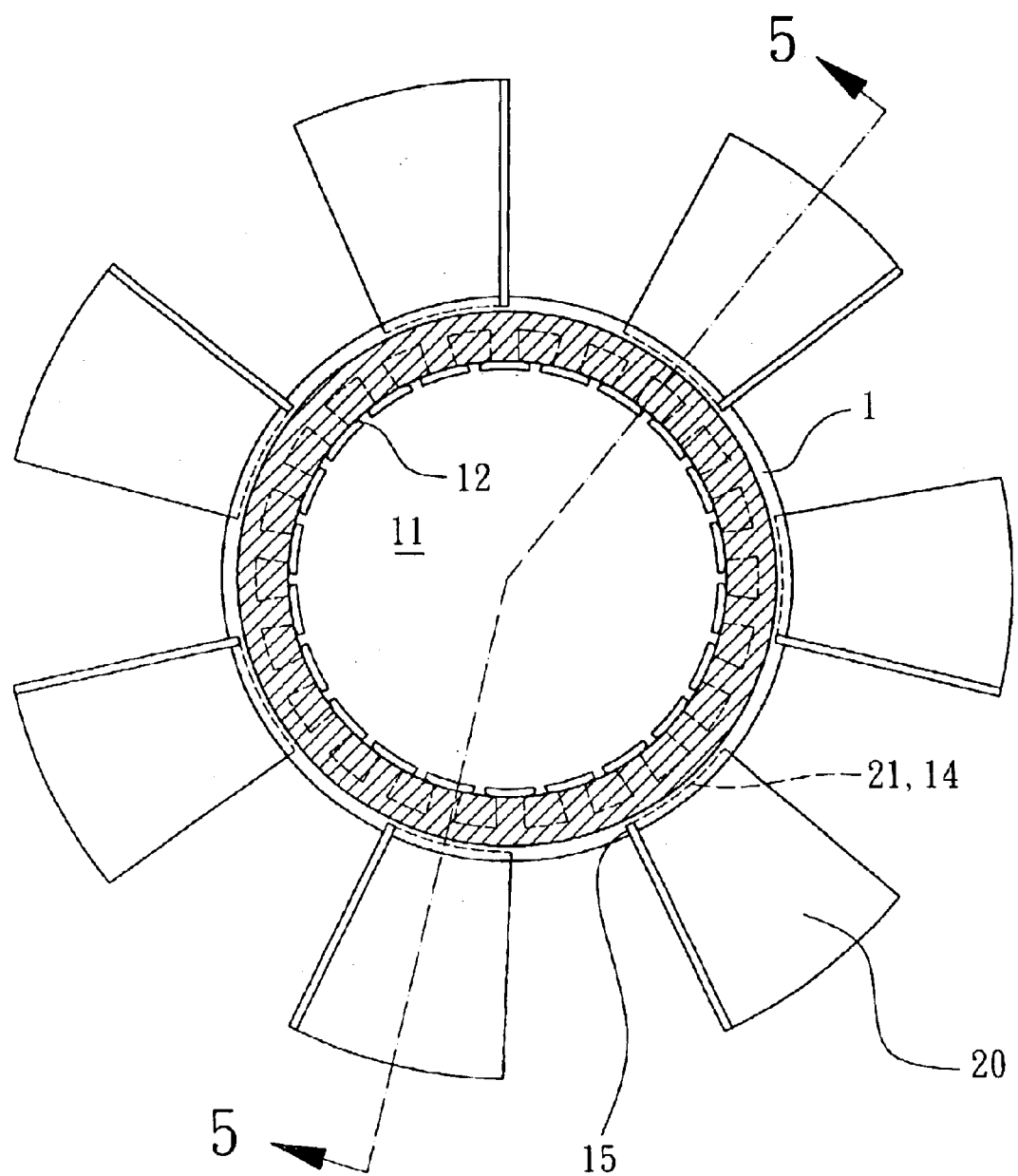
FIG. 4 is a top view of the outer rotor structure for the ac fan in accordance with the embodiment of the present invention.
Figure 5:
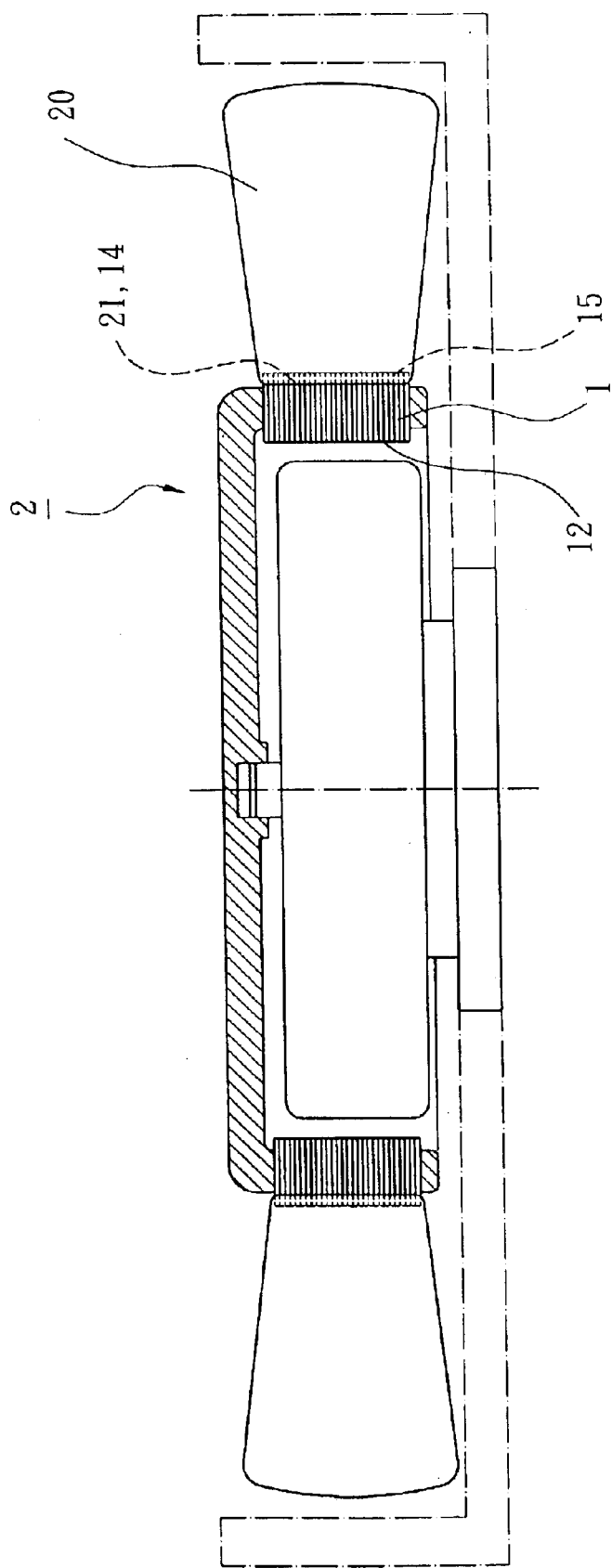
FIG. 5 is a cross-sectional view, taken along line 5—5, of the outer rotor structure for the ac fan in accordance with the embodiment of the present invention.

Referring to FIGS. 4 and 5, since the outer circumference of the outer rotor 1 is provided with the helical assembling members 15, the blades 20 are able to connect precisely thereto without any assistance of an aligning facility. The finished product of the fan wheel 2 may perform with a desired balance in rotation.

Figure 1:
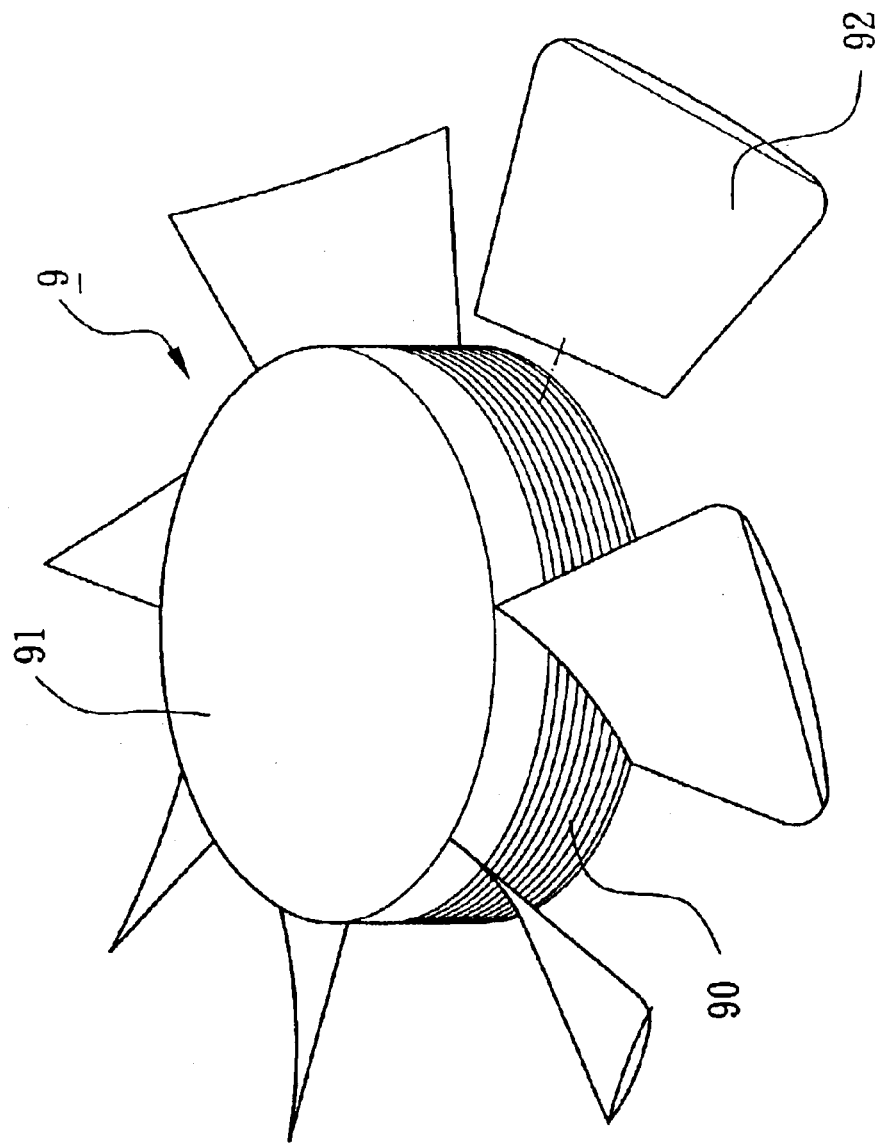
FIG. 1 is an exploded perspective view of a conventional outer rotor structure for an ac fan in accordance with the prior art.

Referring back to FIGS. 1 and 3, the outer circumference of the conventional rotor hub 91 has no fixing support for welding points and thereby a unilateral force biases the first welding of one of the blades 91. However, the outer circumference of the outer rotor 1 of the present invention is provided with the helical assembling grooves 15, which may eliminate any aligning facility in operations. Consequently, manufacture operation is speeded up and convenient.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An outer rotor, comprising:

a plurality of annular pole plates, each of which has an axial hole, a plurality of radially inwardly extending inner poles arranged around the axial hole, an outer circumference, and a plurality of recessions arranged around the outer circumference, the stacked pole plates being provided with a plurality of helical assembling grooves formed by the connected recessions; and a plurality of metal blades, each of which includes an end extending into and connected to the associated assembling groove.

2. The outer rotor as defined in claim 1, wherein the recession are equi-spaced on the outer circumference of the pole plate.

3. The outer rotor as defined in claim 1, wherein the assembling members are equi-spaced on the outer circumference of the stacked pole plates.

4. The outer rotor as defined in claim 1, wherein the pole plate further includes at least one aligning member so that any two pole plates are stacked along a vertical line defined by the aligning members.

5. The outer rotor as defined in claim 1, wherein the at least one aligning member includes a complementary depression and protrusion defined on both side surfaces of the pole plate.

* * * * *